US 6,671,640 B2

(12) United States Patent
Okuchi et al.

(10) Patent No.: US 6,671,640 B2
(45) Date of Patent: Dec. 30, 2003

(54) AUTOMATIC OPTICAL-AXIS ADJUSTING DEVICE FOR AUTOMATICALLY ADJUSTING DIRECTIONS OF OPTICAL AXES OF FRONT LIGHTS WITH RESPECT TO STEERING ANGLE OF STEERING WHEEL

(75) Inventors: Hiroaki Okuchi, Farmington Hills, MI (US); Kunio Ohashi, Toyota (JP); Yuji Yamada, Okazaki (JP); Yoshiyuki Miki, Susono (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 09/968,606

(22) Filed: Oct. 2, 2001

(65) Prior Publication Data

US 2002/0040281 A1 Apr. 4, 2002

(30) Foreign Application Priority Data

Oct. 3, 2000 (JP) ......................................... 2000-303281

(51) Int. Cl.[7] ............................................... G06F 19/00
(52) U.S. Cl. ........................... 702/95; 702/151; 701/41; 701/49; 362/36; 362/37
(58) Field of Search .......................... 702/95, 151, 150; 701/41, 49; 362/36, 37, 40, 459, 475, 476

(56) References Cited

U.S. PATENT DOCUMENTS

| | | | |
|---|---|---|---|
| 5,660,454 A | | 8/1997 | Mori et al. |
| 5,931,572 A | | 8/1999 | Gotoh |
| 6,193,398 B1 | * | 2/2001 | Okuchi et al. ............... 362/466 |
| 2002/0036901 A1 | * | 3/2002 | Horii et al. .................... 362/37 |

FOREIGN PATENT DOCUMENTS

| | | |
|---|---|---|
| JP | A-2-34444 | 2/1990 |
| JP | A-2-45233 | 2/1990 |
| JP | A-2-45235 | 2/1990 |
| JP | A-2-81743 | 3/1990 |
| JP | B2-2950897 | 7/1999 |

* cited by examiner

*Primary Examiner*—John Barlow
*Assistant Examiner*—Hien Vo
(74) *Attorney, Agent, or Firm*—Posz & Bethards, PLC

(57) ABSTRACT

A filter is changed to change a response in swivel adjustment of a direction of an optical axis of each swivel light based on a steering angle variation of a steering angle of a steering wheel measured with a steering angle sensor. The direction of the optical axis of each swivel light is adjusted based on a swivel control angle obtained upon application of the filter. A weaker filter is selected if the steering wheel is quickly steered, and a stronger filter is selected if the steering wheel is slowly steered. By this filtering operation, the direction of the optical axis of each swivel light is adjusted in response to the steering operation of the steering wheel without causing an uncomfortable feeling to a driver.

6 Claims, 5 Drawing Sheets

AUTOMATIC OPTICAL-AXIS ADJUSTING DEVICE FOR AUTOMATICALLY ADJUSTING DIRECTIONS OF OPTICAL AXES OF FRONT LIGHTS WITH RESPECT TO STEERING ANGLE OF STEERING WHEEL

CROSS REFERENCE TO RELATED APPLICATION

This application is based on and incorporates herein by reference Japanese Patent Application No. 2000-303281 filed on Oct. 3, 2000.

BACKGROUND OF THE INVENTION

1. Field of the Invention

The present invention relates to an automatic optical-axis adjusting device for automatically adjusting directions of optical axes and illuminating zones of front lights of a vehicle with respect to a steering angle of a steering wheel.

2. Description of Related Art

One automatic optical-axis adjusting device for automatically adjusting optical axes of front lights of a vehicle is disclosed, for example, in Japanese Patent No. 2950897. Japanese Patent No. 2950897 discloses a technique for changing the optical axes of the front lights (vehicle lamps) based on a steering angle of a steering wheel of the vehicle. More specifically, a non-sensing region is provided around a neutral point of the steering angle of the steering wheel. Movements of the optical axes of the front lights are prevented when the steering wheel is steered within the non-sensing region. In this way, the optical axes of the front lights are not varied when the steering wheel is steered within a play angle of the steering wheel around the neutral point of the steering wheel. A width of the non-sensing region varies in response to a vehicle speed. More specifically, the width of the non-sensing region increases as the vehicle speed increases, so that the swivel control operation of the front lights is carried out in a manner that is inconsistent with a driver's demand.

However, in this automatic optical-axis adjusting device, the optical axes of the front lights are adjusted in the left or right direction in a sensitive manner with respect to the small steering movements of the steering wheel at an outside of the non-sensing region of the steering wheel, causing an uncomfortable feeling to the driver.

SUMMARY OF THE INVENTION

The present invention addresses the above disadvantage, and it is an objective of the present invention to provide an automatic optical-axis adjusting device for automatically adjusting a direction of an optical axis of each corresponding front light of a vehicle based on a steering angle of a steering wheel without causing an uncomfortable feeling to a vehicle driver.

To achieve the objective of the present invention, there is provided an automatic optical-axis adjusting device for automatically adjusting a direction of an optical axis of at least one front light of a vehicle. The automatic optical-axis adjusting device includes a steering angle measuring means, a response changing means and a swivel control means. The steering angle measuring means is provided for measuring a steering angle of a steering wheel of the vehicle. The response changing means is provided for changing a response in swivel adjustment of the direction of the optical axis of the at least one front light of the vehicle based on an angular positional change rate of the steering angle measured with the steering angle measuring means. The swivel control means is provided for adjusting the direction of the optical axis of the at least one front light with respect to the steering angle measured with the steering angle measuring means based on a control angle obtained through the response changing means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described.

Figure 1:
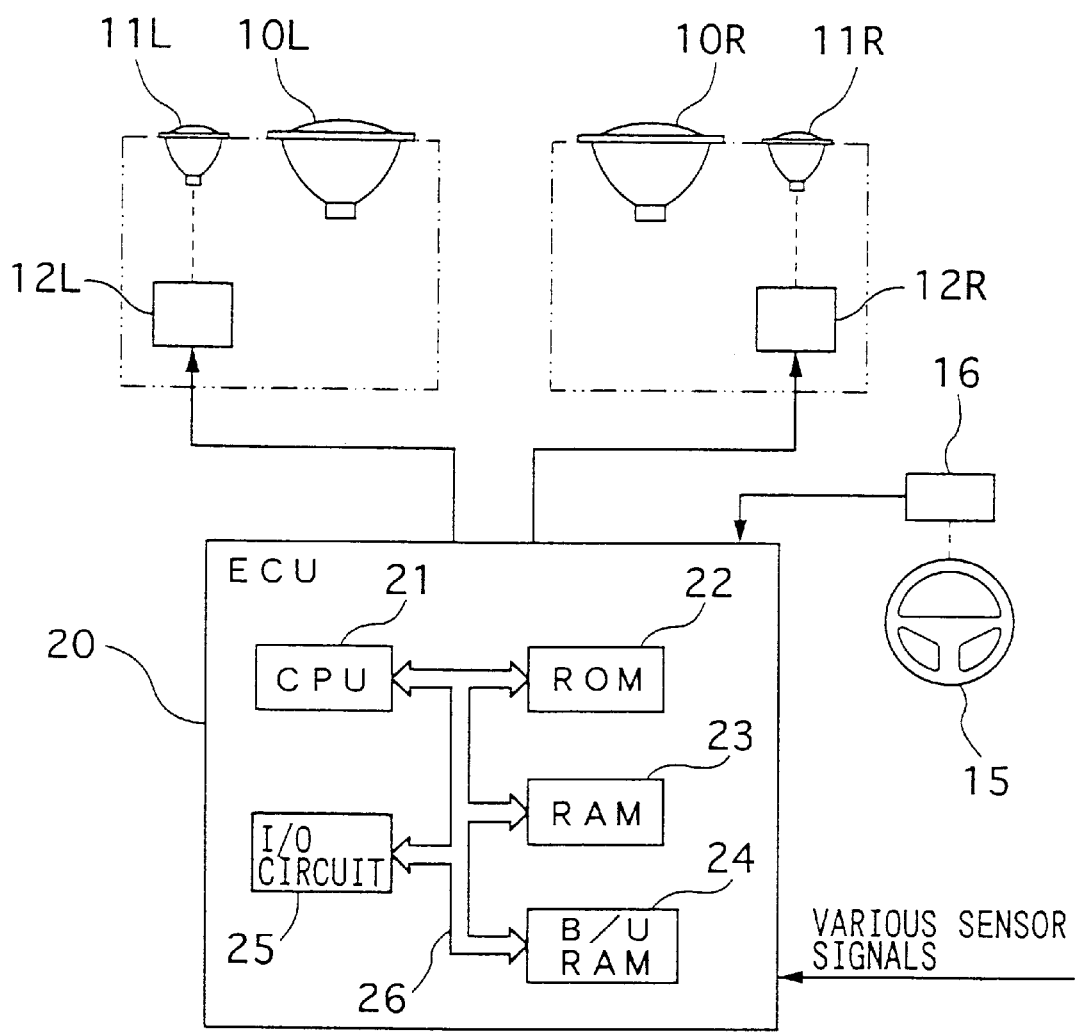
FIG. 1 is a schematic view showing an entire structure of an automatic optical-axis adjusting device for automatically adjusting optical axes of front lights of a vehicle according to an embodiment of the present invention.

With reference to FIG. 1, left and right headlights 10L, 10R as well as left and right swivel lights 11L, 11R are arranged at a front of the vehicle as vehicle front lights. A reference numeral 20 denotes an electronic control unit (ECU). The ECU 20 is formed as a logical operation circuit that includes a CPU 21, a ROM 22, a RAM 23, a backup (B/U) RAM 24, an input-output (I/O) circuit 25 and a bus line 26. The CPU 21 is a central processing unit that carries out various known arithmetic operations. The ROM 22 stores control programs. The RAM 23 stores various data. The bus line 26 interconnects the components of the ECU 20.

An output signal from a steering angle sensor 16 that measures a steering angle STA of a steering wheel 15 and various other sensor signals are inputted to the ECU 20. Output signals from the ECU 20 are inputted to actuators 12L, 12R of the left and right swivel lights 11L, 11R, respectively. Directions of optical axes of the left and right swivel lights 11L, 11R are adjusted based on the output signals from the ECU 20, as will be described in greater detail below.

Figure 2:
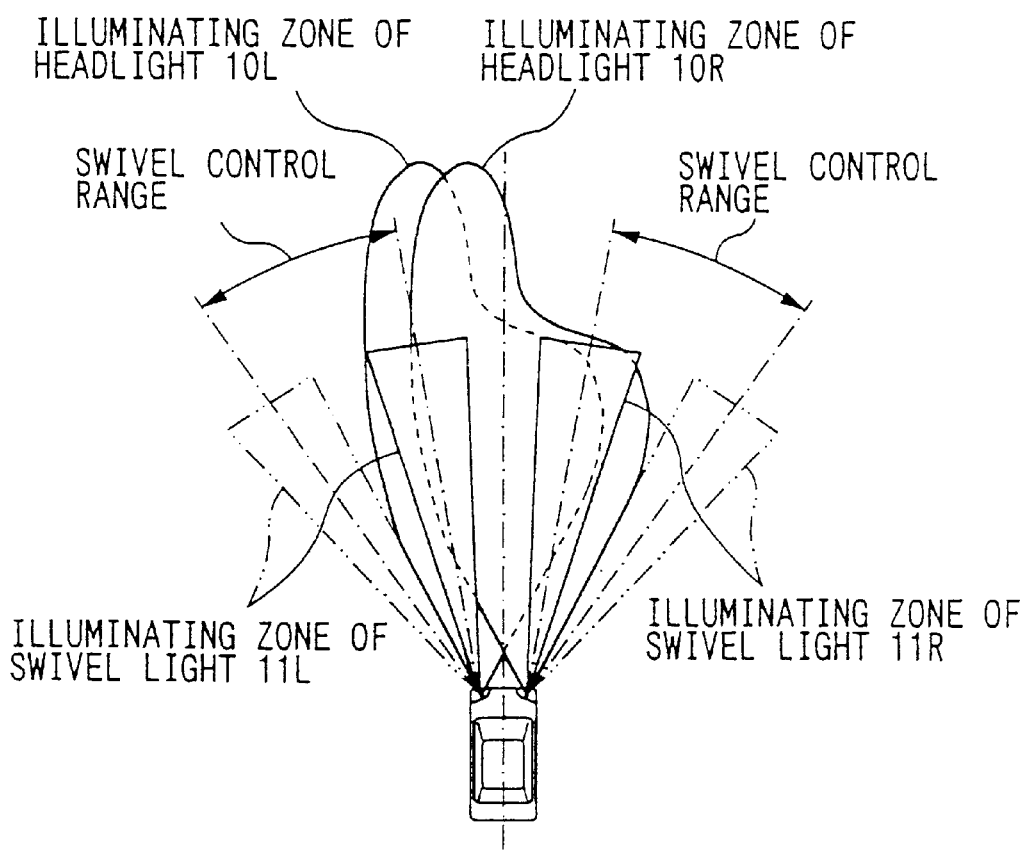
FIG. 2 is a schematic view showing illuminating zones of headlights and illuminating zones of swivel lights in the automatic optical-axis adjusting device according to the embodiment of the present invention.

In the present embodiment, as shown in FIG. 2, an illuminating zone (measured during the low beam state) of a light beam (left beam) emitted from the headlight 10L and an illuminating zone (measured during the low beam state) of a light beam (right beam) emitted from the headlight 10R are substantially fixed. On the other hand, an illuminating zone of the swivel light 11L can be adjusted within its swivel control range in response to steering movement of the steering wheel 15 in the left or right direction from its neutral point, and an illuminating zone of the swivel light 11R can also be adjusted within its swivel control range in response to steering movement of the steering wheel 15 in the left or right direction from its neutral point.

Next, a filter selecting operation carried out in the CPU 21 of the ECU 20 will be described with reference to FIGS. 3 to 6. A filter selecting routine shown in FIG. 3 is repeated in the CPU 21 at predetermined time intervals.

Figure 3:
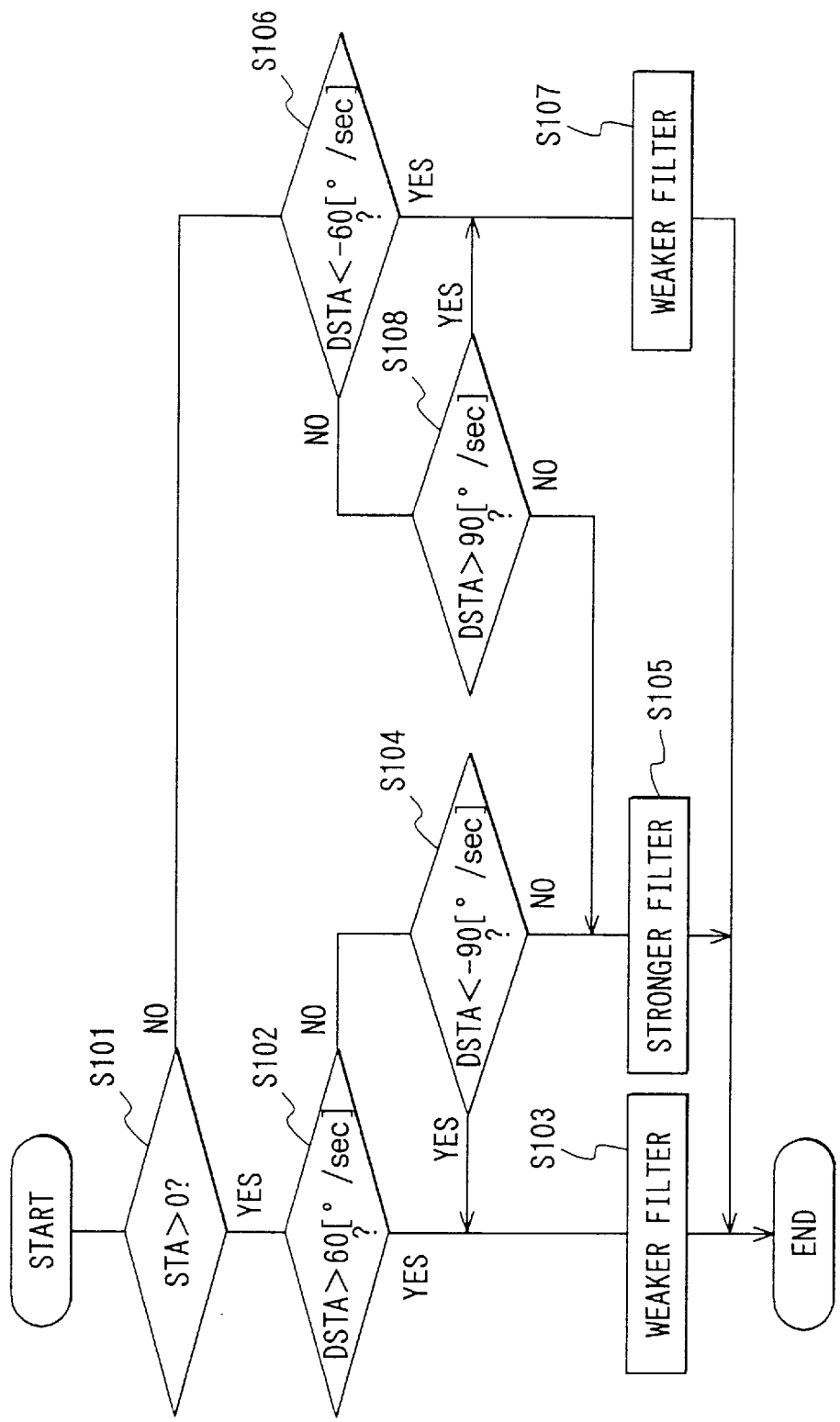
FIG. 3 is a flowchart depicting a procedure of a filter selecting operation carried out in a CPU of an ECU used in the automatic optical-axis adjusting device according to the embodiment of the present invention.

With reference to FIG. 3, at step S101, it is determined whether the steering angle STA of the steering wheel 15 is greater than zero, i.e., is positive. For example, if the steering angle STA is positive, it indicates that the steering wheel 15 is steered in the right direction. If yes is returned at step S101, i.e., if the steering angle STA is positive, and thereby the steering wheel 15 is determined to be steered in the right direction, control moves to step S102. At step S102, it is determined whether a variation (steering angle variation) DSTA in the steering angle per second (unit time) is greater than 60 degrees per second (threshold value).

If yes is returned at step S102, i.e., if the steering angle variation DSTA is greater than 60 degrees per second (i.e., exceeding 60 degrees per second), and thereby the steering wheel 15 is determined to be quickly steered in the right direction, control moves to step S103. At step S103, a weaker filter is selected, and the present routine ends. In a filtering operation with the weaker filter, the swivel control angle (filtered angle) SWC determined based on the target swivel angle SWT corresponding to a change in the steering angle STA of the steering wheel 15 becomes highly sensitive to small changes in the steering angle STA of the steering wheel 15.

Figure 4:
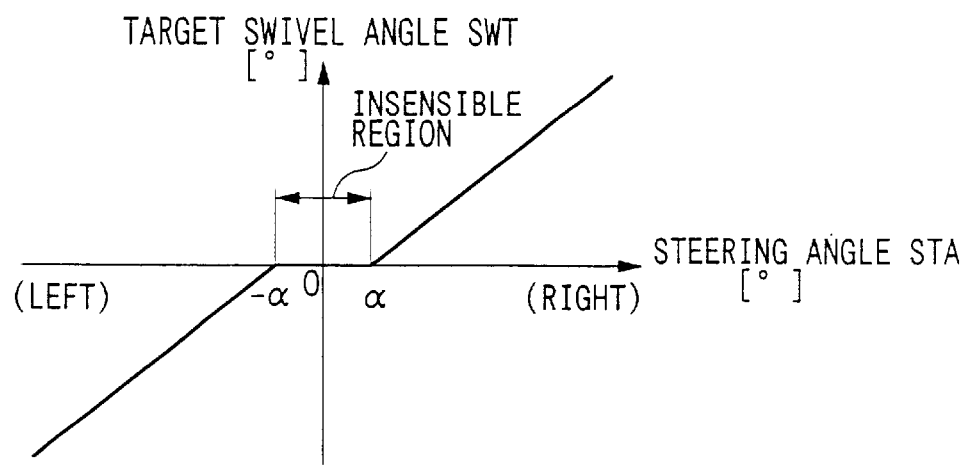
FIG. 4 is a map used for obtaining a target swivel angle based on a steering angle of FIG. 3 that is used as a parameter.
Figure 5:
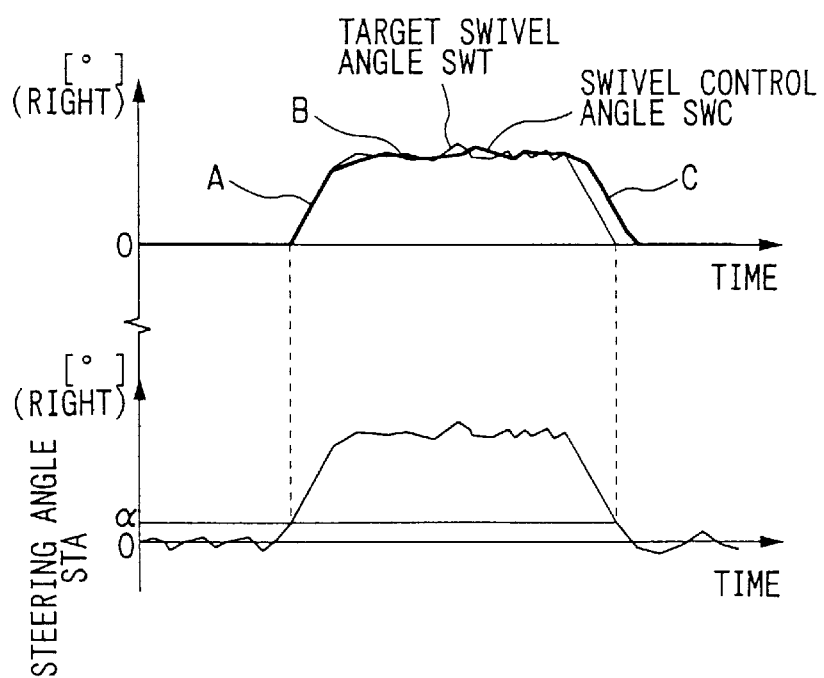
FIG. 5 is a time chart showing changes in the steering angle in the right direction, changes in the target swivel angle in the right direction and changes in swivel control angle in the right direction in the operation of FIG. 3.
Figure 6:
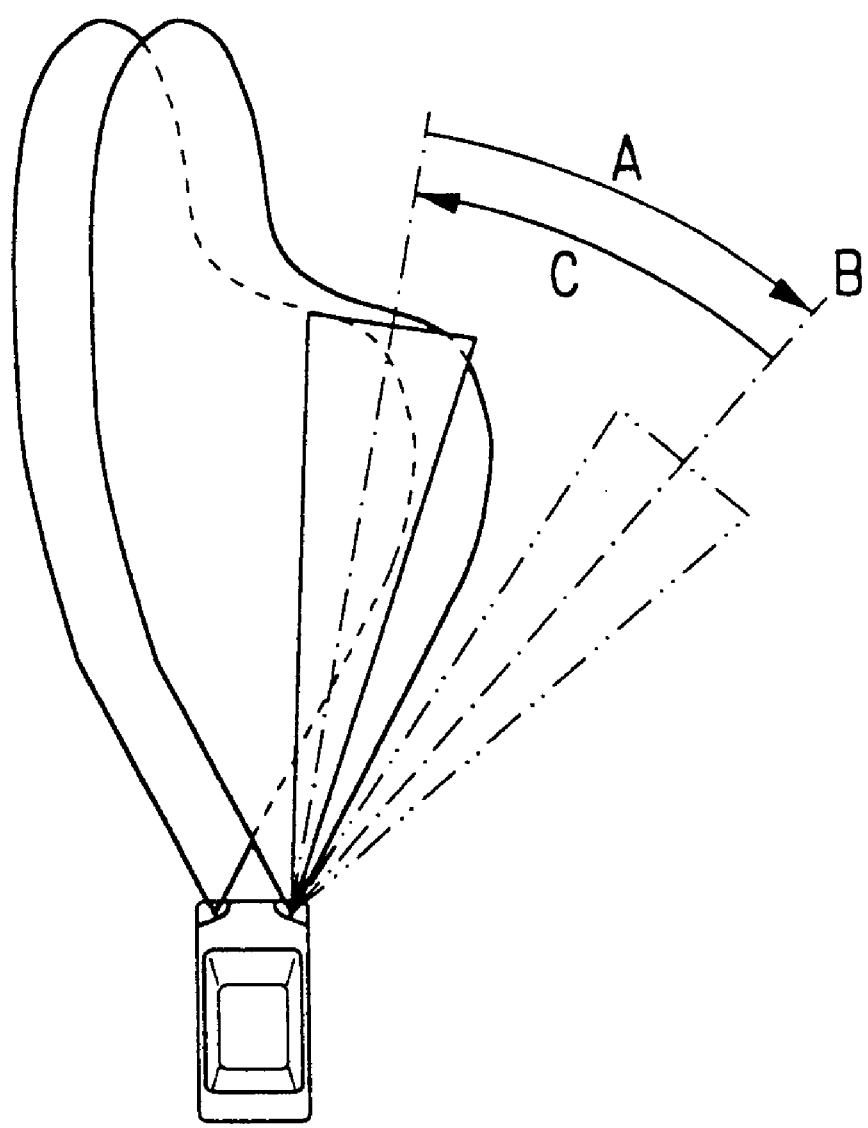
FIG. 6 is a schematic view showing movements of an illuminating zone of the swivel light corresponding to the swivel control angles shown in FIG. 5.

In this operation, as shown in FIG. 4, the change in the steering angle STA at an outside of the non-sensing region ($-\alpha<$STA$<\alpha$) is measured, and then the target swivel angle SWT corresponding to this change in the steering angle STA is obtained. By applying the weaker filter to the target swivel angle SWT, the swivel control angle SWC that changes in a quick linear fashion is obtained (see a steep rise A in the swivel control angle SWC in FIG. 5). The direction of the optical axis of each one of the left and right swivel lights 11L, 11R is automatically adjusted in swivel adjustment based on the swivel control angle SWC (see an arrow A of FIG. 6 that indicates movement of the illuminating zone of the swivel light 11R corresponding to the steep rise A in the swivel control angle SWC of FIG. 5).

If no is returned at step S102, i.e., if the steering angle variation DSTA is small, that is, is equal to or less than 60 degrees per second (i.e., not exceeding 60 degrees per second), control moves to step S104. At step S104, it is determined whether the steering angle variation DSTA is less than −90 degrees per second (threshold value). If the steering angle variation DSTA is negative, it indicates that the steering angle STA of the steering wheel 15 is on a return side (left direction). If yes is returned at step S104, i.e., if the steering angle variation DSTA is small, that is, is less than −90 degrees per second (i.e., exceeding −90 degrees per second), and thereby the steering wheel 15 is determined to be quickly steered in the left direction, control moves to step S103. At step S103, the weaker filter is selected, and the present routine ends.

If no is returned at step S104, i.e., if the steering angle variation DSTA is in a range of 60 to −90 degrees per second, and thereby the steering wheel 15 is determined to be slowly steered in the right direction or is determined to be slowly returned to the left direction, control moves to step S105. At step S105, a stronger filter is selected, and the present routine ends. In a filtering operation with the stronger filter, the swivel control angle SWC determined based on the target swivel angle SWT corresponding to the change in the steering angle STA of the steering wheel 15 does not show small changes due to the fact that high frequency vibrational components are removed from the steering angle STA by the stronger filter.

In this case, as shown in FIG. 4, the target swivel angle SWT that corresponds to the change in the steering angle STA at the outside of the non-sensing region ($-\alpha<$STA$<\alpha$) is obtained. The stronger filter is applied to the target swivel angle SWT, so that the swivel control angle SWC changes in a less responsive fashion (see a portion "B" that does not show large changes in the swivel control angle SWC in FIG. 5, and also see a gradual drop "C" in the swivel control angle SWC in FIG. 5). Based on the swivel control angle SWC, the automatic adjustment of the optical axes of the left and right swivel lights 11L, 11R is conducted (see a steering position B of FIG. 6 that indicates movement of the illuminating zone of the swivel light 11R corresponding to the portion "B" in the swivel control angle SWC of FIG. 5, and also see an arrow "C" of FIG. 6 that indicates movement of the illuminating zone of the swivel light 11R corresponding to the gradual drop "C" in the swivel control angle SWC of FIG. 5).

If no is returned at step S101, i.e., if the steering angle STA is zero or negative, and thereby the steering wheel 15 is determined to be steered to the neutral point or in the left direction, respectively, control moves to step S106. At step S106, it is determined whether the steering angle variation DSTA is less than −60 degrees per second (threshold value). If yes is returned at step S106, i.e., if the steering angle variation DSTA is small, that is, is less than −60 degrees per second (i.e., exceeding −60 degrees per second), and thereby the steering wheel 15 is determined to be quickly steered in the left direction, control moves to step S107. At step S107, similar to step S103, the weaker filter is selected, and the present routine ends.

If no is returned at step S106, i.e., if the steering angle variation DSTA is large, that is, is equal to or greater than −60 degrees per second (i.e., not exceeding −60 degrees per second), control moves to step S108. At step S108, it is determined whether the steering angle variation DSTA is greater than 90 degrees per second (threshold value). If yes is returned at step S108, i.e., the steering angle variation DSTA is large, that is, is greater than 90 degrees per second (i.e., exceeding 90 degrees per second), and thereby the steering wheel 15 is determined to be quickly returned to the right direction, control moves to step S107. At step S107, the weaker filter is selected, and the present routine ends. On the other hand, if no is returned at step S108, i.e., if the steering angle variation DSTA is in a range of −60 to 90 degrees per second, and thereby the steering wheel 15 is determined to be slowly steered in the left direction or is determined to be slowly returned in the right direction, control moves to step S105. At step S105, the stronger filter is selected, and the present routine ends.

As described above, the automatic optical-axis adjusting device for automatically adjusting the directions of the optical axes of the front lights of the vehicle according to the present embodiment includes the steering angle sensor 16, which acts as a steering angle measuring means for measuring the steering angle STA (degrees) of the steering wheel 15 of the vehicles. The automatic optical-axis adjusting device also includes the ECU 20, which acts as a response changing means and also as a swivel control means. The response changing means changes the filter to change a response in the swivel adjustment of the direction of the optical axis of each swivel light (front light) 11L, 11R of the vehicle based on the steering angle variation (angular positional change rate) DSTA of the steering angle STA measured with the steering angle sensor 16. The swivel control means adjusts the direction of the optical axis of each swivel light 11L, 11R with respect to the steering angle STA measured with the steering angle sensor 16 based on the swivel control angle SWC determined by the response changing means by filtering the steering angle STA measured with the steering angle sensor 16 (or by filtering the target swivel angle SWT) through the filter selected by the response changing means.

That is, the filter is selected to change the response to a change in the steering angle STA during the swivel adjustment of the direction of the optical axis of each swivel light 11L, 11R based on the steering angle variation DSTA of the steering angle STA of the steering wheel 15 measured with the steering angle sensor 16. The direction of the optical axis of each swivel light 11L, 11R is adjusted based on the swivel control angle SWC obtained by filtering through the selected filter. At this stage, the weaker filter is selected if it is determined that the steering wheel 15 is quickly steered. The stronger filter is selected if it is determined that the steering wheel 15 is slowly steered. By the filtering operation through the selected filter, the swivel control of the direction of the optical axis of each swivel light 11L, 11R can be conducted based on the steering operation of the steering wheel 15 without causing uncomfortable feeling to the driver.

The steering angle sensor 16 acting as the steering angle measuring means of the automatic optical-axis adjusting device according to the present embodiment sets the non-sensing region around the neutral point (zero degree) of the steering angle STA. In this arrangement, the optical axes of the swivel lights 11L, 11R are prevented from turning in the left or right direction in response to the steering movement of the steering wheel 15 within the play angle of the steering wheel 15 around the neutral point or in response to the small steering movement of the steering wheel 15, so that the steering operation can be conducted without being uncomfortable for the driver.

The above embodiment can be modified as follows.

In the above embodiment, in addition to the left and right headlights 10L, 10R, the left and right swivel lights 11L, 11R are provided as the front lights of the vehicle, and the swivel control is conducted for the left and right swivel lights 11L, 11R. However, in practice of the present invention, the invention is not limited to the above embodiment. For example, the headlights 10L, 10R can be also directly turned through corresponding actuators in a manner similar to that of the swivel lights 11L, 11R.

Furthermore, at step S101 of FIG. 3 of the above embodiment, it is determined whether the steering angle STA of the steering wheel 15 is greater than zero, i.e., is positive, and if the steering angle STA is positive, the steering wheel 15 is determined to be steered in the right direction. This can be modified as follows. That is, if the steering angle STA is positive, the steering wheel 15 may be determined to be steered in the left direction, and if the steering angle STA is negative, the steering wheel 15 may be determined to be steered in the right direction.

Additional advantages and modifications will readily occur to those skilled in the art. The invention in its broader terms is therefore, not limited to the specific details, representative apparatus, and illustrative examples shown and described.

What is claimed is:

1. An automatic optical-axis adjusting device for automatically adjusting a direction of an optical axis of at least one front light of a vehicle, said automatic optical-axis adjusting device comprising:

steering angle measuring means for measuring a steering angle of a steering wheel of said vehicle;

response changing means for changing a response in swivel adjustment of said direction of said optical axis of said at least one front light of said vehicle by changing a filter based on an angular positional change rate of said steering angle measured with said steering angle measuring means, wherein said filter is selected from a group consisting of a weaker filter and a stronger filter, said weaker filter is selected when said angular positional change rate of said steering angle exceeds a predetermined threshold value, and said stronger filter is selected when said angular positional change rate of said steering angle does not exceed said predetermined threshold value; and swivel control means for adjusting said direction of said optical axis of said at least one front light with respect to said steering angle measured with said steering angle measuring means based on a control angle obtained through said response changing means.

2. An automatic optical-axis adjusting device according to claim 1, wherein said steering angle measuring means sets a non-sensing region around a neutral point of said steering angle.

3. An automatic optical-axis adjusting device according to claim 1, wherein said control angle is obtained by filtering said steering angle measured with said steering angle measuring means through said filter.

4. An automatic optical-axis adjusting device for a vehicle comprising:

a steering angle sensor for measuring a steering angle of a steering wheel of the vehicle; and an electronic control unit (ECU) for changing a response in swivel adjustment of a direction of an optical axis of at least one front light of the vehicle by changing a filter based on an angular positional change rate of the steering angle measured with the steering angle sensor, wherein the filter is selected from a group comprising a weaker filter and a stronger filter, the weaker filter is selected when the angular positional change rate of the steering angle exceeds a predetermined threshold value, and the stronger filter is selected when the angular positional change rate of the steering angle does not exceed the predetermined threshold value, and the ECU is further for obtaining a control angle and for adjusting the direction of the optical axis of the at least one front light with respect to the steering angle measured with the steering angle sensor based on the control angle.

5. An automatic optical-axis adjusting device according to claim 4, wherein the steering angle sensor sets a non-sensing region around a neutral point of the steering angle.

6. An automatic optical-axis adjusting device according to claim 4, wherein the ECU obtains the control angle by filtering the steering angle measured with the steering angle sensor through the filter.

* * * * *